(12) United States Patent
Chen et al.

(10) Patent No.: US 11,793,289 B2
(45) Date of Patent: Oct. 24, 2023

(54) ARTIFICIAL NAIL TIP AND CURING COMPOSITION SET AND APPLYING METHOD THEREOF

(71) Applicant: APPLIED LACQUER INDUSTRIES INC., City of Industry, CA (US)

(72) Inventors: Wan Jou Chen, Rowland Heights, CA (US); Carol Ma, Hacienda Heights, CA (US)

(73) Assignee: APPLIED LACQUER INDUSTRIES INC., City of Industry, CA (US)

( * ) Notice: Subject to any disclaimer, the term of this patent is extended or adjusted under 35 U.S.C. 154(b) by 89 days.

(21) Appl. No.: 17/358,740

(22) Filed: Jun. 25, 2021

(65) Prior Publication Data

US 2021/0315360 A1   Oct. 14, 2021

Related U.S. Application Data

(63) Continuation-in-part of application No. 16/299,103, filed on Mar. 11, 2019, now Pat. No. 11,224,276, which is a continuation of application No. 15/916,216, filed on Mar. 8, 2018, now Pat. No. 11,304,492.

(51) Int. Cl.
| | |
|---|---|
| A45D 31/00 | (2006.01) |
| C09J 175/14 | (2006.01) |
| C09D 175/16 | (2006.01) |
| A45D 29/18 | (2006.01) |
| A45D 29/12 | (2006.01) |
| A45D 29/04 | (2006.01) |

(52) U.S. Cl.
CPC ............ *A45D 31/00* (2013.01); *A45D 29/18* (2013.01); *C09D 175/16* (2013.01); *C09J 175/14* (2013.01); *A45D 29/04* (2013.01); *A45D 29/12* (2013.01); *A45D 2200/25* (2013.01)

(58) Field of Classification Search
None
See application file for complete search history.

(56) References Cited

U.S. PATENT DOCUMENTS

| | | | | |
|---|---|---|---|---|
| 4,876,121 | A | * | 10/1989 | Cohen ................... A45D 31/00 156/289 |
| 6,394,100 | B1 | | 5/2002 | Chang |
| 2007/0235051 | A1 | | 10/2007 | Robinson |

(Continued)

FOREIGN PATENT DOCUMENTS

| | | |
|---|---|---|
| CN | 101084186 A | 12/2007 |
| CN | 102766399 A | 11/2012 |

(Continued)

OTHER PUBLICATIONS

European Patent Office: "Extended European Search Report" re: EPO patent application serial No. 19764584.9, dated Nov. 21, 2021, 8 pages.

(Continued)

*Primary Examiner* — Nicole P Babson
(74) *Attorney, Agent, or Firm* — Pillsbury Winthrop Shaw Pittman LLP

(57) ABSTRACT

An artificial nail tip having a plurality of smile line guidelines embedded on the surface of the artificial nail tip, which allows a user or a nail professional to easily create smile lines of varying depths on the artificial nail tip is described.

17 Claims, 13 Drawing Sheets

(56) References Cited

U.S. PATENT DOCUMENTS

| 2010/0008876 | A1 | 1/2010 | Tanaka et al. |
| 2011/0256079 | A1 | 10/2011 | Kozacheck |
| 2013/0333713 | A1 | 12/2013 | Mehta |
| 2015/0224045 | A1 | 8/2015 | Doan |

FOREIGN PATENT DOCUMENTS

| CN | 107411309 A | 12/2017 |
| EP | 1311627 A2 | 5/2003 |
| JP | 2017/210475 A | 11/2017 |
| WO | 2017/082058 A1 | 5/2017 |

OTHER PUBLICATIONS

Nailpromagazine, XP No. 55861387, "Howto Apply Apres GEl Nail Extensions" <https://www.youtube.com/watch?v=MNczt_gcU_w&t=14s>; Online Publication Date Dec. 12, 2017, accessed Nov. 15, 2021.

The State Intellectual Property Office of People's Republic of China : "Notification to Grant Patent Right for Invention" re: Chinese patent application serial No. 201910176116.3, dated May 27, 2022, 8 pages.

Bluesky UV Gel, <http://www.beauty-product.nl/PDF/MSDS3steps.pdf>; available Feb. 12, 2015; accessed Aug. 14, 2020 (Year: 2015).

Sree Roy, <https://www.nailsmag.com/387143/the-science-of-gels-how-gel-nail-products-work>; available Mar. 14, 2011; accessed Aug. 14, 2020 (Year: 2011).

Kay. Tiny plastic fingernails <http://tinyplasticfingernails.blogspot.com/2011/07/what-i-learned-at-kiss-nails-webinar.html> available Jul. 7, 2011; accesses Feb. 4, 2021 (Year: 2011).

Screen captures from You Tube video clip entitled "Apres Gel-X: Entire Set Demo", 7 pages, uploaded on Aug. 11, 2017 by user "Apres Nails Official". Retrieved from Internet: <https://www.youtube.com/watch?v=KvUkLmYHI0w>. (Year: 2017).

Nails at Panache, <https://nailsatpanache.wordpress.com/2013/05/15/do-it-yourself-acrylic-part-2/>; accessed Feb. 5, 2021 ; available May 15, 2013 (Year: 2013).

Daily Charme Diamond Shine No-Wipe Gel Top Coat, <https://dailycharme.com/products/daily-charme-diamond-shine-gel-top-coat#!#shopify-product-reviews> prior to Dec. 20, 2017 (Year: 2017).

Japan Patent Office: "Notice of Reasons for Rejection" re: Japanese patent application serial No. 2019-039243, dated Sep. 7, 2021, 5 pages.

The State Intellectual Property Office of People's Republic of China: "First Office Action" re: Chinese patent application serial No. 2019101761116.3 dated Aug. 25, 2021, 33 pages.

China National Intellectual Property Administration (CNIPA): "Second Office Action" re: Chinese patent application serial No. 201910176116.3, dated Mar. 17, 2022, 6 pages.

\* cited by examiner

| Gel Composition 10 | | |
|---|---|---|
| CHEMICAL NAME | CAS NUMBER | WT/WT % |
| Polyurethane Acylate Oligomer 11 | NA | 60.0-80.0% |
| 2-Hydroxyethyl methacrylate 12 | 868-77-9 | 10.0-15.0% |
| 1-Hydroxycyclohexyl phenyl ketone 13 | 947-19-3 | 1.0-5.0% |
| Phenylbis(2,4,6-trimethylbenzoyl)phosphine oxide 14 | 162881-26-7 | 1.0-5.0% |

FIG. 12

| MSDS top gel coat 70 | | | |
|---|---|---|---|
| CHEMICAL NAME | CAS # | EINECS # | % |
| Polyurethane Acylate Oligomers 71 | Exempt | N/A | 60.0-80.0% |
| 2-Hydroxyethyl methacrylate(HEMA) 72 | 868-77-9 | N/A | 10.0-15.0% |
| Di-Trimethylolpropane Tetraacrylate 73 | 94108-97-1 | N/A | 1.0-5.0% |
| PETMP 74 | 7575-23-7 | N/A | 1.0-5.0% |
| Polyether-Modified Polysiloxane 75 | 157479-55-5 | N/A | 0.0-1.0% |

FIG. 13

ARTIFICIAL NAIL TIP AND CURING COMPOSITION SET AND APPLYING METHOD THEREOF

CROSS REFERENCE OF RELATED APPLICATION

This patent application is a continuation-in-part of U.S. patent application Ser. No. 16/299,103, filed Mar. 11, 2019, which is a continuation of U.S. patent application Ser. No. 15/916,216, filed Mar. 8, 2018. The afore-mentioned patent applications are hereby incorporated by reference in their entirety.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND

Field of Invention

The present invention relates to a nail tip composition, and more particularly to a set of artificial nail tip and curing composition set and applying method thereof, which not only can reduce the curing and hardening time of the artificial nail tip on the fingernail but also can prevent unnecessary damages to fingernails. The present invention also relates to an artificial nail tip having a plurality of guidelines embedded on a surface of the artificial nail tip, which provides accurate guidance to a user or a nail professional to easily apply a coating composition on the nail tip as opposed to requiring the user or nail professional to apply by "eyeballing" the application. In one embodiment, the guidelines provide representation of smile lines for a French manicure such that a user or nail professional can accurately create or apply a nail composition to form a smile line on the nail tip. In such embodiments, the smile lines are presented in an array of varying depths on the artificial nail tip so that the user or nail professional can select where the smile line is created.

Description of Related Arts

Gel nail art is a decorate beautification work of nails, which is considered as an art design nowadays. The gel nail art has the characteristics of the diversification of various forms. According to the hand shape, the fingernail shape, the color of the skin, clothing and other requirements, the gel nail art is a process of nail disinfection, cleaning, care, maintenance, and decorate beautification. A French manicure is a popular form of manicure that generally makes use of two colors—a sheer nude or light pink color as a base (i.e., the portion extending from the tip of the nail to the cuticle of the nail) and a distinctive white color for a stripe across the nail tip. Historically, the determination of the white stripe is done by sight without any guidance which is difficult to create accurately and evenly across all ten fingernails, especially as fingernails vary in size and width. This difficulty is amplified when using a gel composition as opposed to regular nail polish compositions. Creating and sculpting long, symmetrical, and beautiful nail extensions with either acrylic or hard gel requires extensive years of practice and a high level of skill. Creating beautiful, symmetrical French smile lines using a gel composition is extremely difficult.

Currently, during the gel nail process, phototherapy is used for accelerated weathering. Some people do hand care such as exfoliation before phototherapy manicures. However, exfoliation results in thinning of the skin, which further cause skin aging if the fingernail is directly exposed under the phototherapy lamp such as UV or blue light without sunscreen. The improper gel nail art may cause nail damage, which even causes separation of the nail and the nail bed under the nails and eventually leads to shorter nail bed. Therefore, healthy nail composition as well as the right nail tools are required.

SUMMARY OF THE PRESENT INVENTION

The invention is advantageous in that it provides an artificial nail tip and curing composition set and applying method thereof, which not only decorates fingernails but also protects the fingernails.

Another advantage of the invention is to provide an artificial nail tip and curing composition set and applying method thereof, which not only can reduce the curing and hardening time of the artificial nail tip on the fingernail but also can prevent unnecessary damages to fingernails.

Another advantage of the invention is to provide an artificial nail tip and curing composition set and applying method thereof, which includes a gel composition for firmly affixing the artificial nail tips, namely artificial nail tips, to the surface of the fingernails.

Another advantage of the invention is to provide an artificial nail tip and curing composition set and applying method thereof, which protects the fingernails and reduces the UV damage.

Another advantage of the invention is to provide an artificial nail tip having a plurality of guidelines embedded onto a surface of the artificial nail, such that a user or a nail professional can easily apply a nail polish following the guidelines to create a desirable nail design, such as a French manicure.

Additional advantages and features of the invention will become apparent from the description which follows, and may be realized by means of the instrumentalities and combinations particular point out in the appended claims.

According to the present invention, the foregoing and other objects and advantages are attained by an artificial nail tip including a topside surface and an underside surface, wherein a surface of the nail tip is embedded with a plurality of indented guidelines.

According to the present invention, the foregoing and other objects and advantages are attained by an artificial nail tip and curing composition set, comprising:

at least an artificial nail tip (e.g., GEL-X tip available from Aprés Nails), a gel composition (e.g., Extend Gel available from Aprés Nails), an edge-off flat brush, a nail filing device, a pH bonder (e.g., pH Bonder available from Aprés Nails), and a non-acidic gel primer (e.g., Non-Acidic Gel Primer available from Aprés Nails), wherein the pH bonder forms a pH bonding layer on a surface of a fingernail, wherein the non-acidic gel primer forms a non-acidic gel primer layer overlapped on the pH bonding layer, wherein the gel composition forms a gel layer overlapped on the non-acidic gel primer layer, wherein an underside contact surface of the artificial nail tip is filed by the nail filing device to provide a rough affixing surface and the gel composition is applied on an underside contact surface of the artificial nail tip by the edge-off flat brush until at least the rough affixing surface is significantly or completely covered with the gel composition to form an adhering layer, wherein the underside contact surface of the artificial nail tip is contacted with the gel layer on the fingernail in such a manner that the artificial nail tip is firmly affixed on the fingernail.

In embodiments, the artificial nail tip and curing composition set comprises at least ten artificial nail tips, one for each fingernail. Optionally, the set may contain a plurality of artificial nail tips having various widths, lengths, shapes, and degrees of curvature.

According to the present invention, the foregoing and other objects and advantages are also attained by a method of applying an artificial nail tip on a fingernail, comprising the steps of:

(a) forming a pH bonding layer on a surface of a fingernail by applying a bonding bonder to the fingernail;
(b) forming a non-acidic gel primer layer overlapped on/deposited on the pH bonder layer by applying a non-acidic gel primer on top of the pH bonding layer;
(c) optionally forming a gel layer overlapped on the non-acidic gel primer layer by applying the gel composition on top of the non-acidic gel primer layer;
(d) providing a rough affixing surface on an underside contact surface of the artificial nail tip, wherein the step (d) can be applied before the step (a);
(e) applying the gel composition to the underside contact surface of the artificial nail tip to form a gel composition layer;
(f) pressing the artificial nail tip onto the fingernail gradually from base to tip thereof to prevent air bubbles and to ensure a tight seal; and
(g) pressing down on the artificial nail tip and the fingernail by an external force until the gel layer on the rough affixing surface 411 is cured and hardened with the gel layer on the fingernail 90, such that the artificial nail tip is firmly attached to the fingernail.

In one embodiment, the gel composition can be applied using an edge-off flat brush (e.g., Edge-Off Flat Brush available from Aprés Nail), which is a brush having synthetic fiber bristles suitable for applying nail polish or gel having a thicker viscosity.

In one embodiment, step (d) can be accomplished by filing the underside contact surface of the artificial nail tip by a nail filing device.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 12 is a table illustrating the chemical compositions of the Extend Gel of the nail tip curing composition according to certain embodiments of the present invention.

FIG. 13 is a table illustrating the chemical compositions of the top gel coat of the nail tip curing composition according to certain embodiments of the present invention.

DETAILED DESCRIPTION

The following description is disclosed to enable any person skilled in the art to make and use the present invention. Embodiments are provided in the following description only as examples and modifications will be apparent to those skilled in the art. The general principles defined in the following description would be applied to other embodiments, alternatives, modifications, equivalents, and applications without departing from the spirit and scope of the present invention.

According to certain embodiments of the present invention, there is provided an artificial nail tip including a topside surface and an underside surface, wherein a plurality of guidelines are embedded on a surface of the nail tip surface.

In one embodiment, the guidelines are embedded on the topside surface. In other embodiments, the guidelines are embedded on the underside surface. Generally, the guidelines are more easily seen by users and provide a better structure to guide the gel or polish application when they are embedded on the topside surface.

In embodiments, when the guidelines are embedded on the topside surface of the artificial nail tip, the guidelines may extend as ridges above the nail surface for the purpose of keeping the applications (e.g., nail polish, gel, etc.) from running over. The guidelines embedded on the underside surface of the artificial nail tip can also be seen by users if the nail tip is clear or transparent or partially transparent. The guidelines can be provided in any design or dimensions to provide accurate and easily followed boundaries for applying a nail composition. The nail tips may also include a number or letter etched or embossed on the nail tip surface to indicate which finger each nail tip is made to be used on for easy reference. The number or letter may be etched or embossed either on the topside or underside surface of the artificial nail tip.

In a particular embodiment, the artificial nail tips are injection molded. They can be fabricated, for example, using metal molds that have physical curved lines etched into them. Depending on the design of the mold, the artificial nail tips can have smile line guidelines (e.g., raised lines or ridges) on the topside or underside surface of the nail tip.

Figure 15:
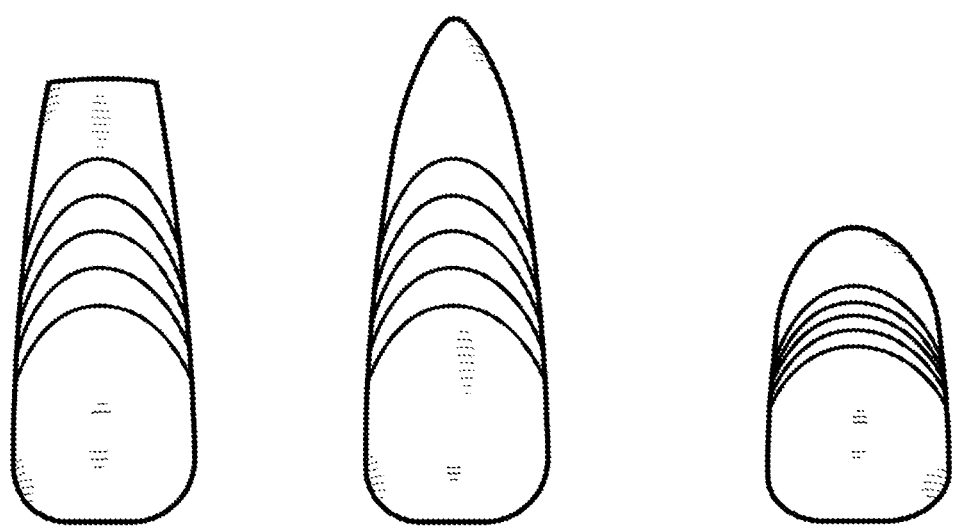
FIG. 15 shows front views of artificial nail tips with a plurality of embedded guidelines according to the certain embodiments of the present invention.

In a particular embodiment, the guidelines are smile lines for guiding a French manicure. Generally, a natural smile line refers to the lengthwise point on a nail where the nail bed ends and the free edge starts. As used herein, the term "smile line guideline" refers to a curved line having two ends, each end of the line touching or pointing towards opposites side of the artificial nail tip, with the highest point the middle of the curved line. FIG. 15 shows a front view of artificial nail tips with embedded smile line guidelines according to certain embodiments of the invention.

In embodiments, the smile line guideline may be symmetrically drawn. The smile line guideline may be shaped in a way that mirrors the shape of a cuticle, or shaped as an inverted "U" or "V." The smile lines in the guideline may be spaced so that they do not overlap or touch. Alternatively, the smile lines may be spaced such that they overlap or touch at one or more points, such as at the ends of the line.

Each smile line guideline may be drawn with a different shape (e.g., having a different curvature) from one another. The smile line guidelines may or may not be spaced apart equally from one another; for example, the spacing between the first smile line guideline (closest to the cuticle of the natural nail) to the second smile line guideline may be smaller or may be greater compared to the spacing between the second smile line guideline and the third smile line guideline. Each spacing, measured from the highest point of the smile line guideline, between two adjacent smile line guidelines, independently, may be from 1 mm to 6 mm, from 1 mm to 5 mm, from 1 mm to 4 mm, from 1 mm to 3 mm, from 1 mm to 2 mm, from 2 mm to 6 mm, from 2 mm to 5 mm, from 2 mm to 4 mm, or from 2 mm to 3 mm.

In embodiments, the spacing measured from each of the two ends of the smile line guideline is different from the spacing measured from the highest point of the smile line guideline between two adjacent smile line guidelines.

In embodiments, each guideline is symmetrically drawn with a gradually wider curvature than a prior guideline.

In embodiments, the topside surface or the underside surface of the artificial nail tip is embedded with a plurality of smile line guidelines, such as, at least two, at least three, at least four, and so forth, or from 2 to 15, from 2 to 12, from 2 to 10, from 2 to 9, from 2 to 8, from 2 to 7, from 2 to 6, from 3 to 15, from 3 to 12, from 3 to 10, from 3 to 9, from 3 to 8, from 3 to 7, from 3 to 6, from 4 to 12, from 4 to 10, from 4 to 8, from 4 to 7, or from 4 to 6 smile line guidelines. In a particular embodiment, an artificial nail tip for guiding a French manicure has six smile lines embedded on the topside surface of the artificial nail tip.

In embodiments, the smile line guidelines are embedded on the underside of the upper portion of the artificial nail tip. In embodiments, when the artificial nail tip is overlapped on the natural fingernail, the smile line guidelines are located above the actual fingernail.

The artificial nail tips may vary in length, curvature, and shape to accommodate users with different natural nail bed shapes and design preferences. The length of the artificial nail tip, may be, for example, short, medium, long or extra-long. The curvature of the artificial nail tip may be, for example, natural curvature (for users with flat or wide nail beds) or sculpted curvature (for users with curved or rounded nail beds). The shape of the artificial nail tip is not particularly limited and may be, for example, round, square, square with rounded corners, oval, squared oval (squoval), almond, lipstick, pointed, stiletto, trapeze, coffin, and the like. In embodiments, the artificial nail tip has a round or "U-shaped" free edge. In embodiments, the artificial nail tip has a pointed or "V-shaped" free edge.

Artificial nail tips having a "coffin shape" have tapered sides and a flat tip, and resemble the angular shape of a coffin. They are also known as "ballerina nails" because the silhouette mimics ballet pointe shoes with a tapered toe and a flat edge.

The shape of the artificial nail tip used for a French manicure in not limited and may vary according to the design preference of the user. In one embodiment, the artificial nail tip for a French manicure has a round shape or coffin shape.

In embodiments, the artificial nail tip is made from a clear, transparent, translucent, or partially transparent material to permit the user or nail professional to see through from the topside of the artificial nail tip to the smile line guidelines that are embedded on the underside of the artificial nail tip.

In embodiments, a user or nail professional may apply a first nail polish on the topside of the entire artificial nail tip to form a first nail polish layer. A first nail polish may include multiple layers of different color of nail polishes. The first nail polish may be a clear or a light color, or a mixture of a clear or light color, such that the smile line guidelines embedded underneath the artificial nail tip can be seen through from the top of the artificial nail tip. A user or nail professional may draw along one of the smile line guidelines on the topside surface of the artificial nail tip or on top of the first nail polish layer. A user or nail professional may apply a second nail polish on the topside surface of the artificial nail tip or on top of the first nail polish layer in the area above one of the smile line guidelines to the edge of the artificial nail tip. In one embodiment, for purpose of creating a French manicure, a contrasting color to the first nail polish, such as, a white color or any shades of a white color nail polish, is used as a second nail polish.

Figure 9:
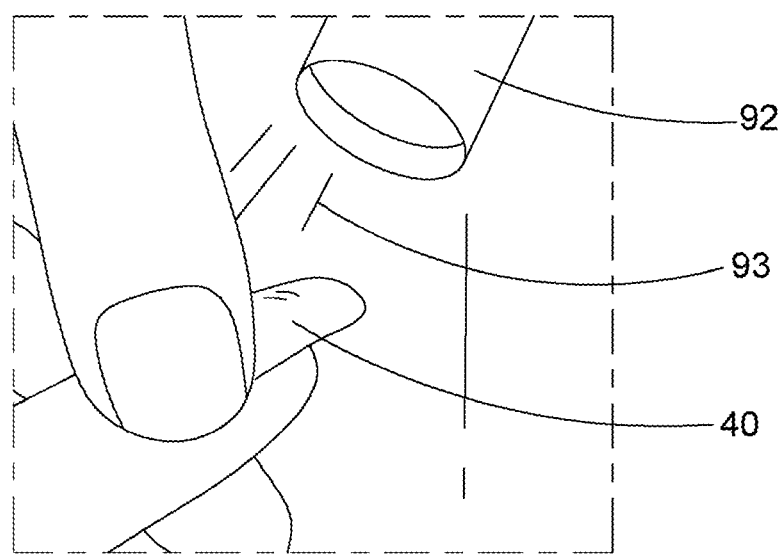
FIG. 9 is a schematic view illustrating the applying method of the artificial nail tip and curing composition set according to certain embodiments of the present invention.
Figure 10:
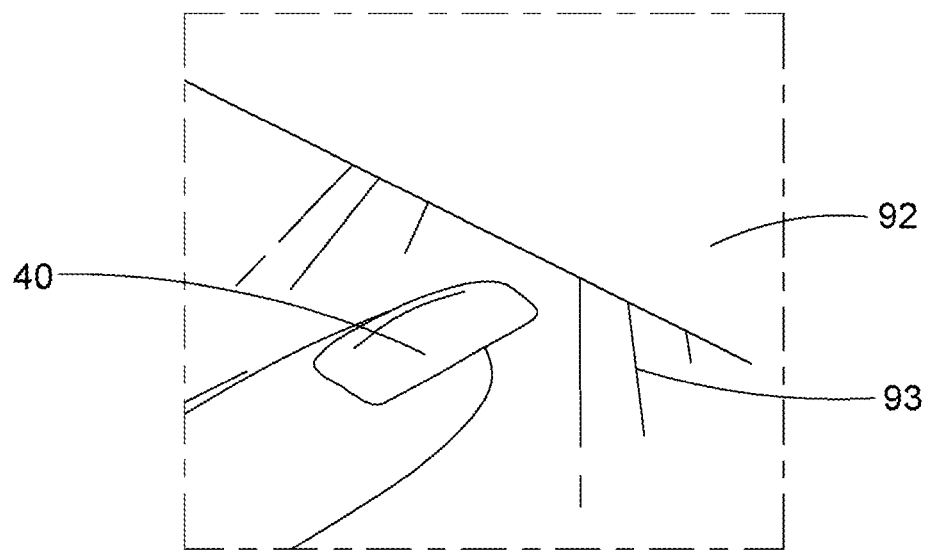
FIG. 10 is a schematic view illustrating the applying method of the artificial nail tip and curing composition set according to certain embodiments of the present invention.
Figure 11:
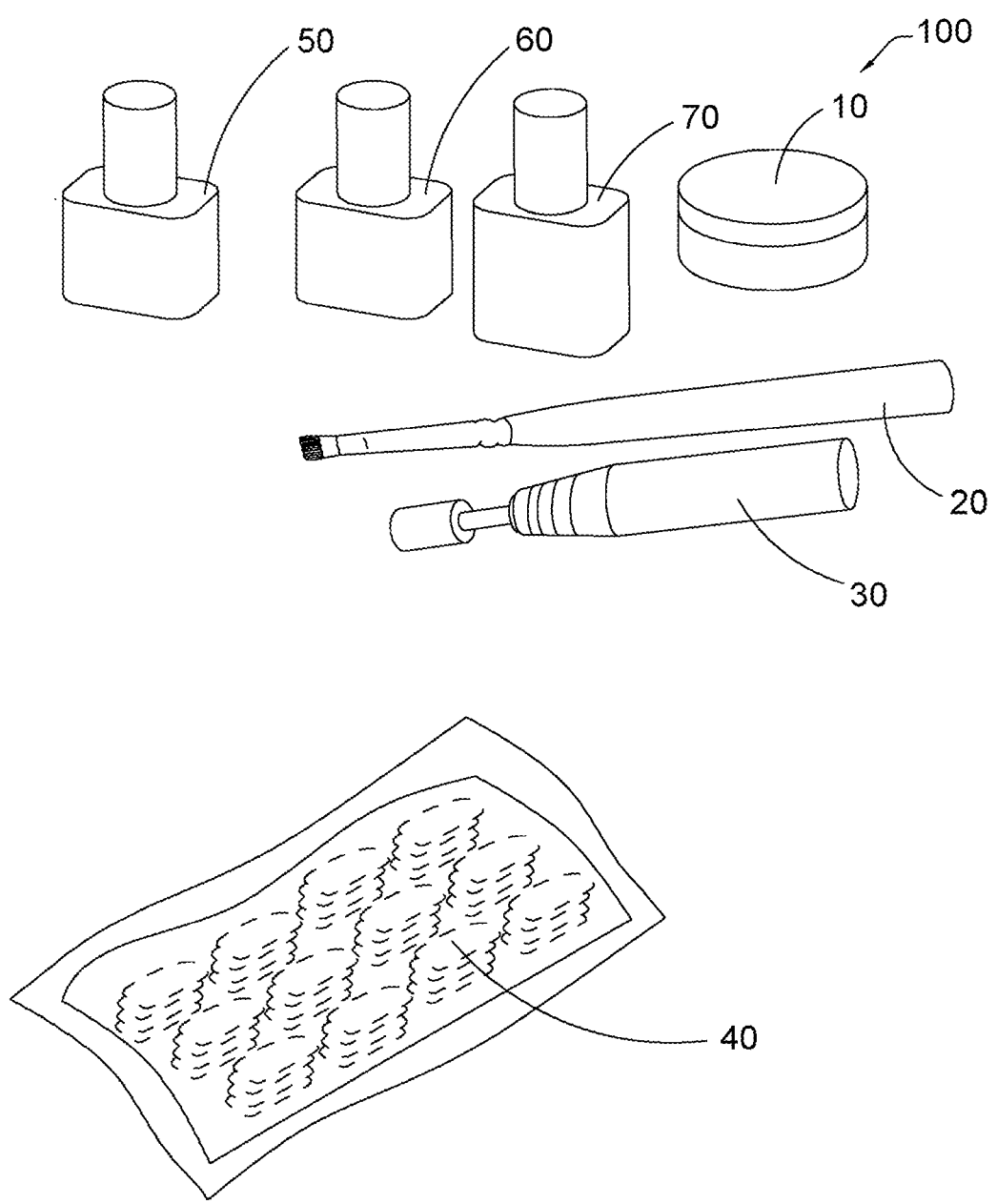
FIG. 11 is a perspective view illustrating the nail tip curing composition set according to certain embodiments of the present invention.

Referring to FIG. 1 to FIG. 11 of the drawings, an artificial nail tip and curing composition set 100 according to an embodiment is illustrated, wherein the nail tip curing composition set 100 comprises a gel composition 10, an edge-off flat brush 20, a nail filing device 30, a plurality of artificial nail tips 40 embodied and named as artificial nail tips, a pH bonder 50, and a non-acidic gel primer 60, as shown in FIG. 11. The gel composition 10 is an adhesive for artificial nail tips.

Figure 1:
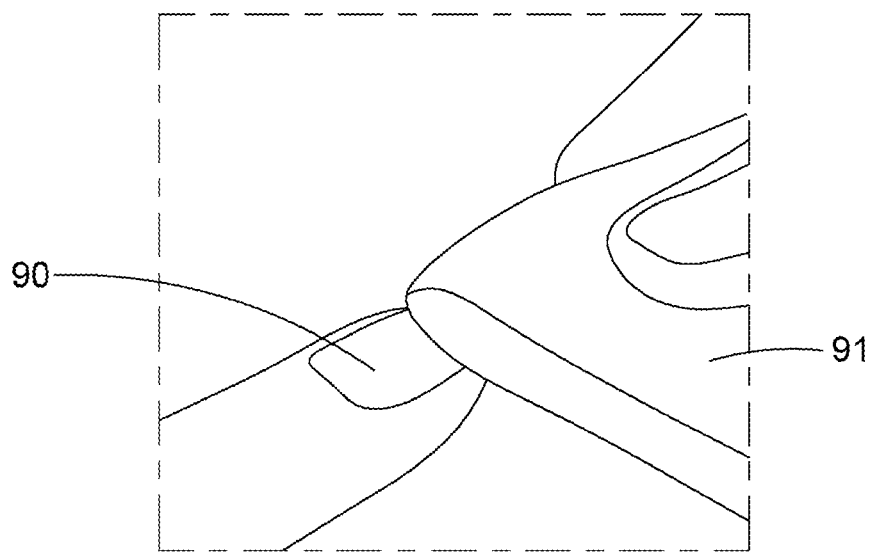
FIG. 1 is a schematic view illustrating an applying method of an artificial nail tip and curing composition set according to certain embodiments of the present invention.

As shown in FIG. 1 of the drawings, before using the nail tip curing composition set 100, a fingernail 90 is wiped by a cotton pad 91 wetted with rubbing alcohol; this cleans the fingernail 90 by removing oil and dust thereon.

Figure 2:
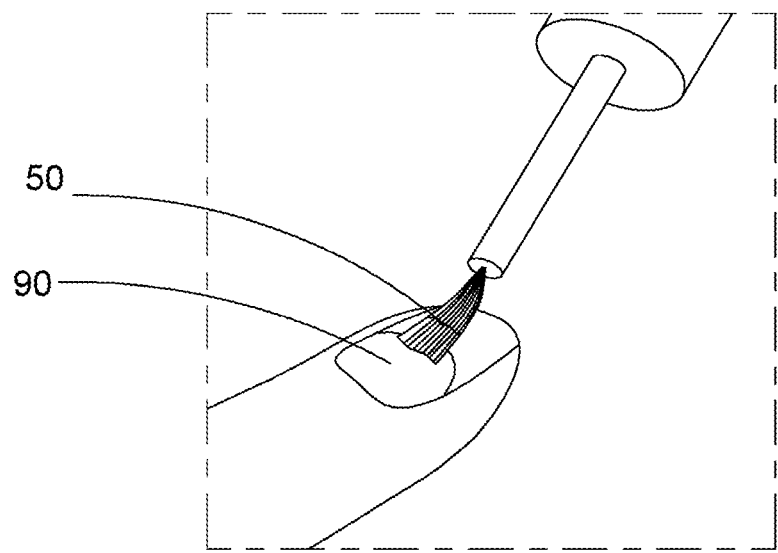
FIG. 2 is a schematic view illustrating the applying method of the artificial nail tip and curing composition set according to certain embodiments of the present invention.
Figure 3:
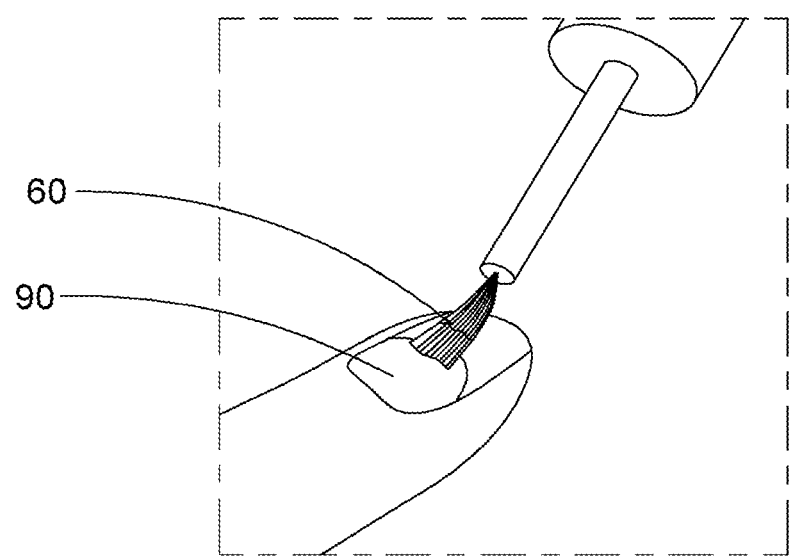
FIG. 3 is a schematic view illustrating the applying method of the artificial nail tip and curing composition set according to certain embodiments of the present invention.
Figure 4:
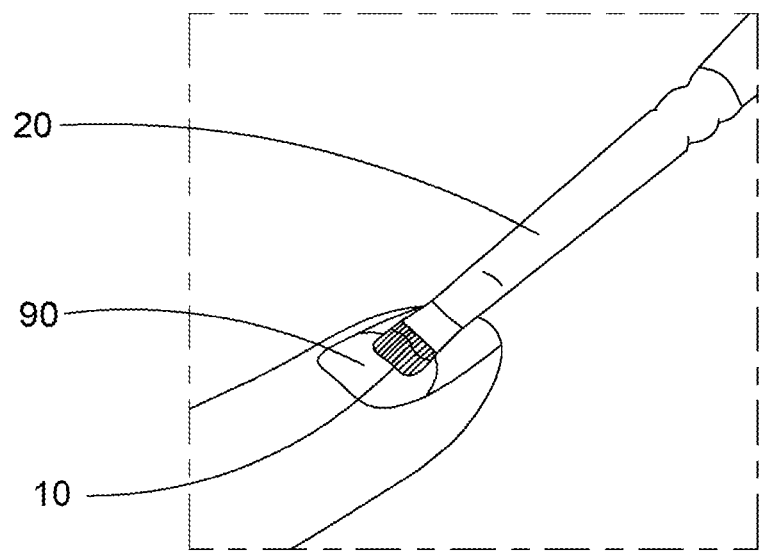
FIG. 4 is a schematic view illustrating the applying method of the artificial nail tip and curing composition set according to certain embodiments of the present invention.

As shown in FIG. 2 of the drawings, pH bonder 50 is applied on the fingernail 90 to dehydrate the surface of the fingernail 90, removing any oils or residues, and adjusting pH. The pH bonder layer applied on the fingernail 90 is allowed to air dry, typically within a few seconds, and then non-acidic gel primer 60 is applied on the fingernail 90 to create a tacky surface for better adhesion to the artificial nail tip. Specifically, as shown in FIG. 3 of the drawings, the non-acidic gel primer 60 is applied on the fingernail 90 to form a non-acidic gel primer layer on the surface of the fingernail 90, which is overlapped on the pH bonder layer. The non-acidic gel primer layer on the fingernail 90 is allowed to air dry, typically within a few seconds, and then an edge-off flat brush 20 is used to apply a thin layer of the gel composition 10 to the fingernail 90. Specifically, as shown in FIG. 4 of the drawings, the thin layer of the gel composition 10 is applied on the fingernail 90 to form a gel layer overlapped on the non-acidic gel primer layer.

Figure 5:
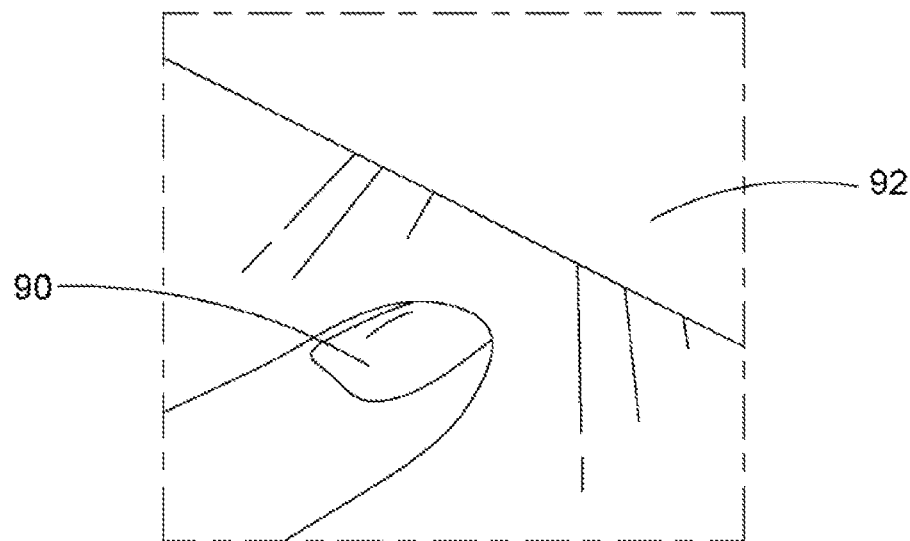
FIG. 5 is a schematic view illustrating the applying method of the artificial nail tip and curing composition set according to certain embodiments of the present invention.

As shown in FIG. 5 of the drawings, according to one embodiment of the present invention, the adhesive gel layer formed by the gel composition 10 and overlapped on the non-acidic gel primer layer on the fingernail 90 is cured with a LED lamp 92 for a period of time, such as about 30 seconds. Alternatively, the adhesive gel composition layer formed by the non-acidic gel primer 10 and overlapped on the non-acidic gel primer layer on the fingernail 90 can be cured with UV lamp for a period of time, such as about 2 minutes.

According to one embodiment of the invention, the artificial nail tip is made of acrylic glass. In embodiments, the amount of acrylic glass is from about 70% to about 100%, from about 80% to about 100%, or from about 90% to about 100% by weight based on the total weight of the artificial nail tip. In one embodiment, the amount of acrylic glass is at least about 90% by weight based on the total weight of the artificial nail tip. In other embodiments, the amount of acrylic glass is from about 70% to about 95%, from about 80% to about 95%, or from about 90% to about 95% by weight based on the total weight of the artificial nail tip.

Before attaching the artificial nail tips 40 on the fingernails, a rough affixing surface 411 is provided on an underside contact surface 41 of each artificial nail tip, which is the lower inner portion of the artificial nail tip having a surface area approximately equal to the surface area of the fingernail that the artificial nail tip is going to be in contact with and affixing thereon. The rough affixing surface 411 can be made during manufacture of the artificial nail tip. The rough affixing surface 411 is coarse and comprises multiple indented grooves 412.

In embodiments, the coarse surface is an area on the underside surface of the nail tip located below the guidelines.

Figure 6:
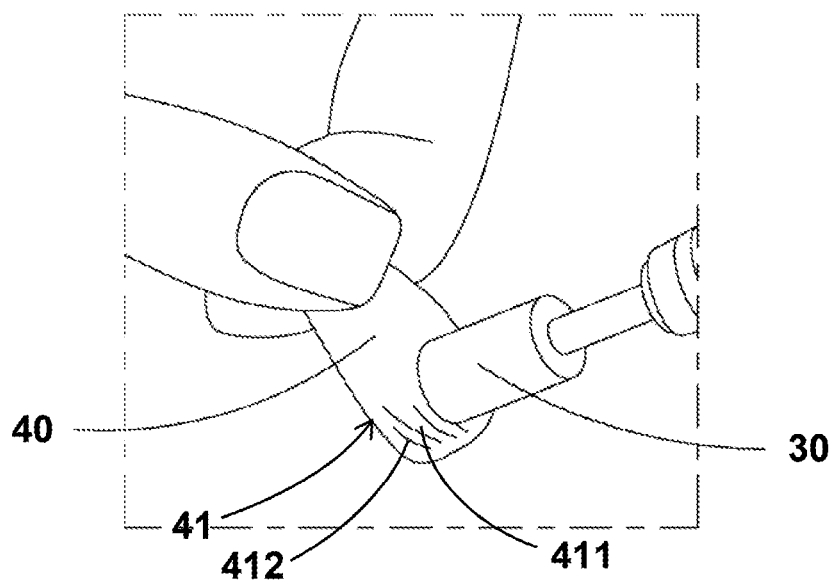
FIG. 6 is a schematic view illustrating the applying method of the artificial nail tip and curing composition set according to certain embodiments of the present invention.

According to one embodiment, the rough affixing surface 411 is provided by means of the nail filing device 30. The underside contact surface 41 is filed by the nail filing device 30 to form the rough affixing surface 411 having multiple small, indented grooves 412 thereon, as shown in FIG. 6. It is appreciated that a health fingernail will generally have a smooth surface. In order to enhance the affixing of the artificial nail tip on the fingernail surface, it is conventional to slightly file the fingernail surface and then apply the glue thereon for adhering the artificial nail tip on the fingernail. To prevent damage to the fingernail, the formation and providing of the rough affixing surface 411 on the underside contact surface 41 of the artificial nail tip 40 is essential for affixing the artificial nail tips 40 to the fingernails according to one embodiment of the present invention.

In other words, starting from a base portion of the underside contact surface 41 of the artificial nail tip, generally half of the underside contact surface 41 is filed to form the rough affixing surface 411. The rough affixing surface 411, especially the presence of the multiple indented grooves 412 formed thereon making the surface 411 a coarse surface, greatly increases the contacting surface area of the rough affixing surface 411 to pick up the gel composition 10. Therefore, more gel composition 10 can be retained on the rough affixing surface 411 of each of the artificial nail tips 40 than on a smooth surface having the same size.

Figure 7:
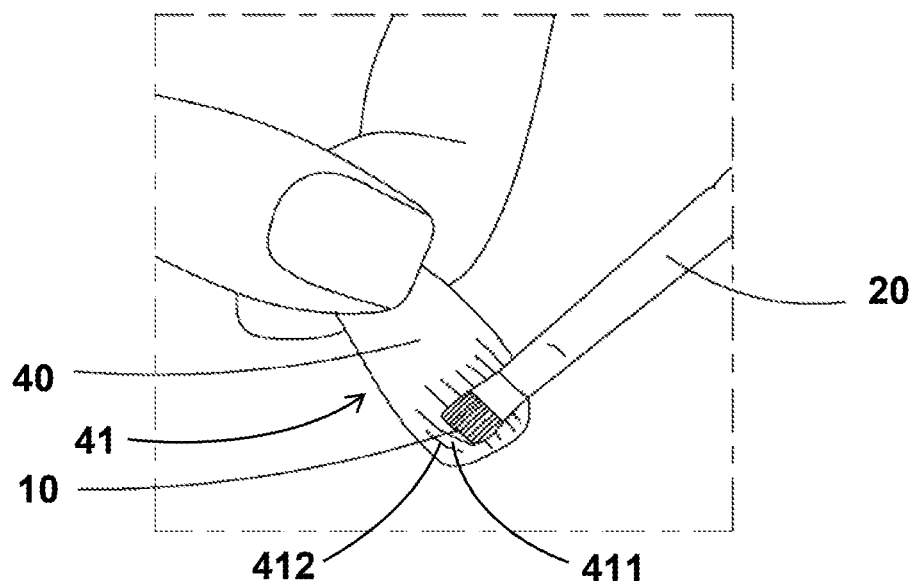
FIG. 7 is a schematic view illustrating the applying method of the artificial nail tip and curing composition set according to certain embodiments of the present invention.

As shown in FIG. 7 of the drawings, a small drop of the gel composition 10, which is enough to cover the natural fingernail, is applied to a base portion of the rough affixing surface 411 of the underside contact surface 41 of artificial nail tip 40 by the edge-off flat brush 20, generally about ⅓ of the surface area of the natural fingernail, to form a gel composition tip layer on the rough affixing surface 411 of the artificial nail tip 40. The gel composition 10 will flow into the multiple indented grooves 412 and be retained therein. In other words, the multiple indented grooves 412 of the rough affixing surface 411 can retain more gel composition 10. Therefore, when the rough affixing surface 411 is in contact with the fingernail surface, the gel composition layer will attach and affix the artificial nail tip 40 onto the fingernail 90, wherein the retaining of the gel composition 10 in the multiple indented grooves 412 substantially increases the thickness of the gel composition 10 between the artificial nail tip 40 and the fingernail 90 that effectively increases the adhering bonding of the artificial nail tip 40 and the fingernail 90 so as to more firmly affix the artificial nail top 40 with the fingernail 90 with less curing and hardening time.

Figure 8:
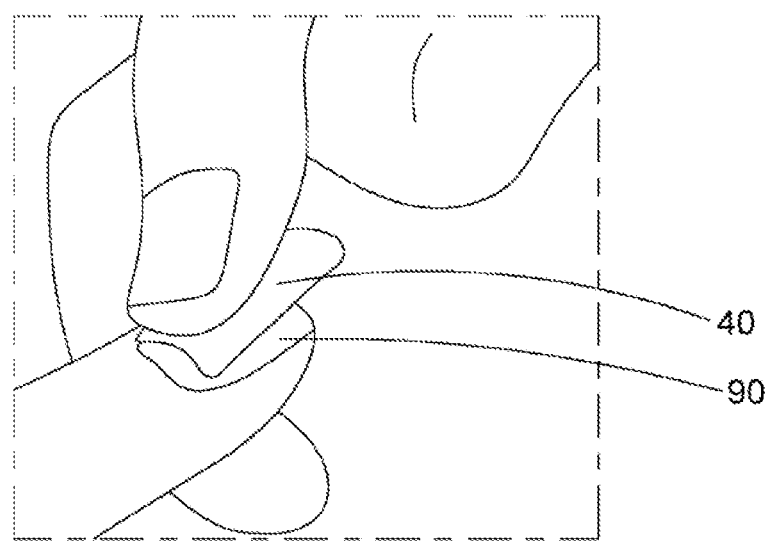
FIG. 8 is a schematic view illustrating the applying method of the artificial nail tip and curing composition set according to certain embodiments of the present invention.

Referring to in FIG. 8 of the drawings, after the gel composition 10 is applied on the rough affixing surface 411 of the underside contact surface 41 of the artificial nail 40, the artificial nail tip 40 is pressed onto the fingernail 90 gradually from base to tip of the artificial nail tip 40 to prevent air bubbles or lifting and to ensure a tight seal.

As shown in FIG. 9 of the drawings, an external force is pressed down the artificial nail tip 40 and the fingernail 90, and then the fingernail 90 with the artificial nail 40 are flash cured with the UV light 93 from LED lamp 92 for about 4 to about 30 seconds, for about 6 to about 15 seconds, for about 8 to about 12 second, or for about 10 seconds. The LED lamp 92 can be a LED flashlight as shown in FIG. 9 or a bridge lamp, such as the Aprés rechargeable X-Lite. Eventually, the external force pressing down the artificial nail tip 40 and the fingernail 90 is removed and UV light 93 from the LED lamp 92 is applied around the sides of the artificial nail tip 40 for a few seconds to ensure that the sides of the artificial nail tip 40 are cured and hardened.

Then, as shown in FIG. 10 of the drawings, the entire fingernail 90 with the artificial nail tip 40 affixed thereon is cured under the LED lamp 92 with UV light 93 for about 30 seconds, until the gel composition layer on the rough affixing surface 411 of the underside contact surface 41 of the artificial nail tip 40 and the gel composition layer on the fingernail 90 are fully cured and hardened integrally to form a bonding gel composition layer between the artificial nail tip 40 and the fingernail 90. In embodiments, the artificial nail tips are affixed to each of the natural fingernails on one hand of the user by flash curing (ca. 10 seconds per nail) and then all five nail tips are fully cured in a LED lamp (ca. 30 seconds). Application of UV light from non-LED lamps to the artificial nail tip may require a slightly longer amount of time to affix the artificial nail tip 40 on the fingernail 90; a maximum application of 2 minutes of UV light to affix the artificial nail tip 40 on the fingernail 90 is sufficient.

It is worth mentioning that since the gel composition 10 of the gel composition layer is retained in the indented grooves 412 of the rough affixing surface 411 of the underside contact surface 41 of the artificial nail tip 40, the gel composition 10 retained in the indented grooves 412 can act like roots to hold the artificial nail tip 40 to the fingernail 90. This greatly enhances the bonding and adhering ability of the cured and hardened bonding gel composition layer between artificial nail tip 40 and the fingernail 90 such that a relatively thin bonding gel composition layer is enough to affix the artificial nail tip 40 on the fingernail 90 firmly for at least a couple of weeks. The artificial nail tips 40 are typically affixed on the fingernail 90 for at least two weeks and more typically for about three weeks without needing replacement. A thin bonding gel composition layer is also advantageous in that it greatly reduces the curing and hardening time needed to affix ten artificial nail tips to the ten fingernails of the user.

To detach the artificial nail tips 40 from the fingernails 90, the user may simply soak the fingernail 90 with the artificial nail 40 thereon into an acetone for a period of time and the artificial nail tip 40 will separate from the fingernail 90.

Gel Composition

In embodiments, the gel composition 10 is used as an artificial nail tip adhesive. The chemical formulation of the gel composition 10 is based on acrylate/methacrylate chemistry, and contains monofunctional and multifunctional acrylate/methacrylate monomers/oligomers and photoinitiators. The gel composition 10 in the uncured state may be a potential sensitizer, a primary eye irritant and a moderate skin irritant.

Specifically, as shown in FIG. 12 of the drawings, the chemical composition of the gel composition 10 includes polyurethane acrylate oligomer 11, 2-hydroxyethyl methacrylate 12, 1-hydroxycyclohexyl phenyl ketone 13, and phenylbis(2,4,6-trimethylbenzoyl)phosphine oxide 14.

In embodiments, the amount of polyurethane acrylate oligomer 11 by weight is from 50 to 90%, from 60 to 80%, or from 65 to 75% based on the total weight of the gel composition; the amount of 2-hydroxyethyl methacrylate 12 by weight is from 10 to 15%, or from 11 to 13% based on the total weight of the gel composition; the amount of 1-hydroxycyclohexyl phenyl ketone 13 by weight is from 1.0 to 5.0%, from 1.5 to 4.5%, or from 2 to 4% based on the total weight of the gel composition; and the amount of phenylbis(2,4,6-trimethylbenzoyl)phosphine oxide 14 by weight is from 1.0 to 5.0%, from 1.5 to 4.5%, or from 2 to 4% based on the total weight of the gel composition.

In embodiments, the specific gravity of the gel composition 10 is 1.06-1.08.

pH Bonder

In embodiments, the pH Bonder 50 include ingredients, such as, for example, ethyl acetate and ammonium hydroxide. In embodiments, the amount of ethyl acetate is from 90 to 98% based on the total weight of the pH bonder. In embodiments, the amount of ammonium hydroxide is from 1 to 5% based on the total weight of the pH bonder.

In embodiments, the viscosity of the pH bonder is about 15 cps and the vapor pressure of the pH bonder at 20° C. is about 76 mm Hg. In embodiments, the density of the pH bonder is about 0.94.

Non-Acidic Gel Primer

In embodiments, the non-acidic gel primer 60 include ingredients, such as, for example, ethyl acetate, isopropylidenediphenyl bisoxyhydroxypropyl methacrylate and 2-hydroxyethyl methacrylate (HEMA). In embodiments, the amount of ethyl acetate by weight is >80% and <90% based on the total weight of the non-acidic gel primer. In embodiments, the amount of isopropylidenediphenyl bisoxyhydroxypropyl methacrylate by weight is >5% and <10% based on the total weight of the non-acidic gel primer. In embodiments, the amount of HEMA by weight is >5% and <10% based on the total weight of the non-acidic gel primer composition.

In embodiments, the viscosity of the non-acidic gel primer is about 15 cps and the vapor pressure at 20° C. of the non-acidic gel primer is about 76 mm Hg. In embodiments, the density of the non-acidic gel primer is from 0.92 to 0.96, or about 94.

As shown in FIG. 11 and FIG. 13 of the drawings, the nail tip composition kit 100 further comprises a top gel coat 70 applied on the fingernail 90.

Top Gel

In embodiments, a top gel coat can be applied on top of an artificial nail or a natural nail.

Specifically, as shown in FIG. 13 of the drawings, the chemical composition of the top gel coat 70 includes polyurethane acrylate oligomers 71, 2-hydroxyethyl methacrylate (HEMA) 72, di(trimethylolpropane) tetraacrylate 73, pentaerythritol tetra(3-mercaptopropionate) (PETMP) 74, and a polyether-modified polysiloxane 75.

More specifically, the amount of polyurethane acrylate oligomers 71 by weight is 60.0-80.0%, the amount of 2-hydroxyethyl methacrylate (HEMA) 72 by weight is 10.0-15.0%, the amount of di(trimethylolpropane) tetraacrylate 73 by weight is 1.0-5.0%, the amount of pentaerythritol tetra(3-mercaptopropionate) (PETMP) 74 by weight is 1.0-5.0%, and the amount of polyether-modified polysiloxane 75 is 0.0-1.0% based on the total weight of the top gel coat composition.

The boiling point of the top gel coat 70 is 212° F.

The flash point (° F.) of the top gel coat 70 is 96° F.

The specific gravity of the top gel coat 70 is 1.14.

The artificial nail tips 40 can be removed by soaking the fingernail 90 with the artificial nail tips 40 in a bowl of acetone. Alternatively, cotton balls saturated with acetone can be placed on the nail tips and then wrapped tightly using aluminum foil.

Figure 14:
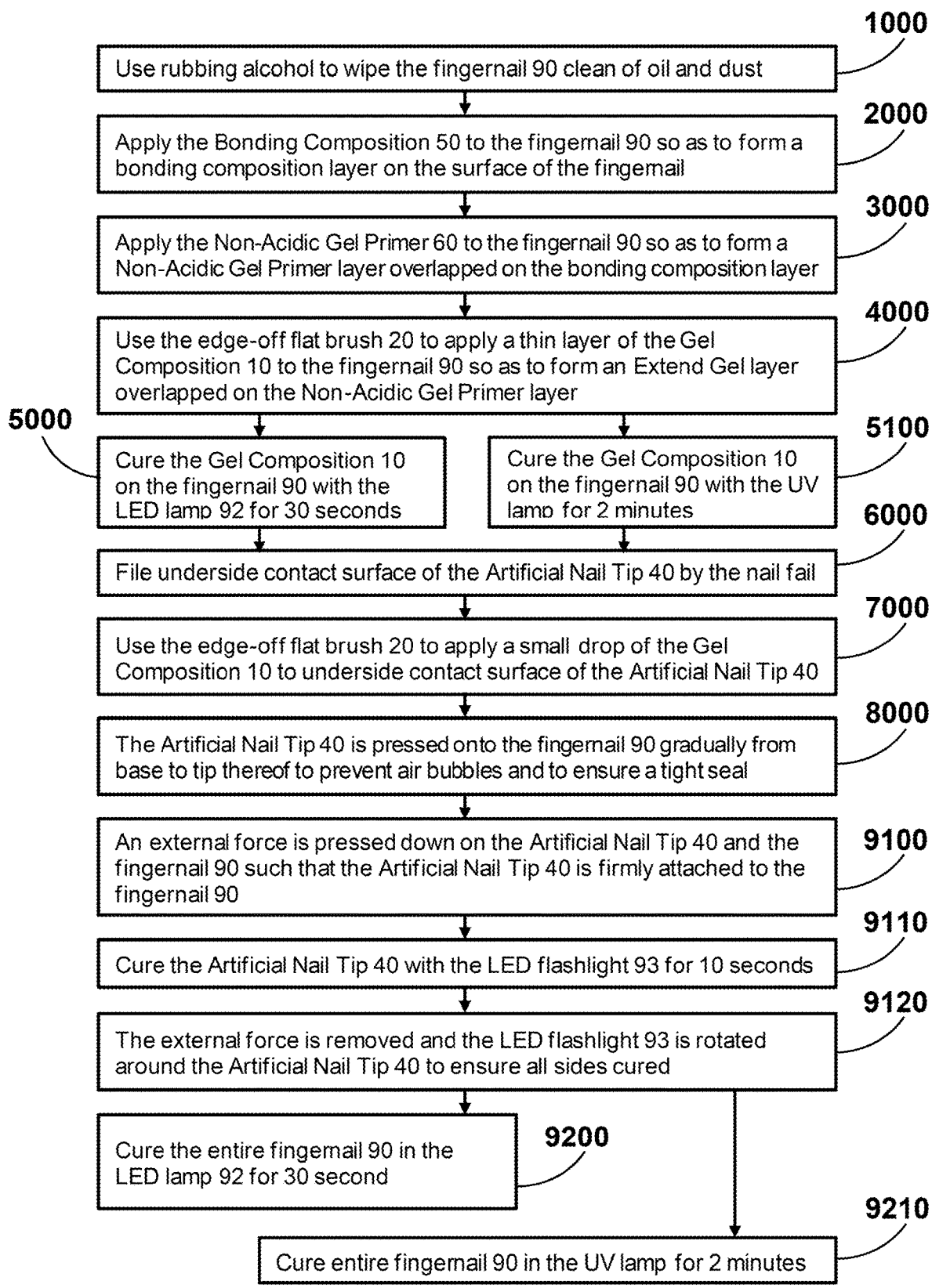
FIG. 14 is a flow diagram of the applying method of the artificial nail tip and curing composition set according to certain embodiments of the present invention.

Also referring to FIG. 14 of the drawings, an applying method of a nail tip composition according to the above embodiment comprises the following steps.

(1000) Use rubbing alcohol to wipe the fingernail 90 to clean off oil and dust on the fingernail 90.

(2000) Apply the pH bonder 50 to the fingernail 90 so as to dehydrate the surface of the fingernail 90 and adjust pH.

(3000) Apply the non-acidic gel primer 60 to the fingernail 90 so as to form a non-acidic gel primer layer overlapped on the pH bonder layer.

(4000) Use the edge-off flat brush 20 to apply a thin layer of the gel composition 10 to the fingernail 90 so as to form a gel composition layer overlapped on the non-acidic gel primer layer.

(5000) Cure the gel composition 10 on the fingernail 90 with the LED lamp 92 for about 30 seconds.

(6000) File the underside contact surface 41 of the artificial nail tip 40 by the nail filing device 30 to form the rough affixing surface 411.

(7000) Use the edge-off flat brush 20 to apply a small drop of the gel composition 10 to at least a base portion of the rough affixing surface 411 of the underside contact surface 41 of the artificial nail tip 40 to form a gel composition layer.

(8000) The artificial nail tip 40 is pressed onto the fingernail 90 gradually from base to tip thereof to prevent air bubbles and to ensure a tight seal.

(9100) An external force is pressed down on the artificial nail tip 40 and the fingernail 90 until the Extend Gel tip layer on the rough affixing surface 411 is cured and hardened with the Extend Gel layer on the fingernail 90, such that the Gel-X tip 40 is firmly attached to the fingernail 90.

(9110) Cure the artificial nail tip 40 with the LED flashlight 93 for about 10 seconds.

(9120) The external force is removed and the LED flashlight 93 is rotated around the Gel-X tip 40 to ensure all sides cured.

(9200) Cure the entire fingernail 90 in the LED lamp 92 for 30 seconds.

Alternatively, step (5000) can be replaced by step: (5100) Cure the gel composition 10 on the fingernail 90 with the UV lamp for about 2 minutes.

Alternatively, step (9200) can be replaced by step (9210): Cure entire fingernail 90 in the UV lamp for about 2 minutes.

It is worth mentioning that in the applying method of the nail tip composition kit 100 according to the one embodiment of the present invention, the chemical composition of the gel composition 10 includes 60.0-80.0% by weight of the polyurethane acrylate oligomer 11, 10.0-15.0% by weight of 2-hydroxyethyl methacrylate 12, 1.0-5.0% by weight of 1-hydroxycyclohexyl phenyl ketone 13, and 1.0-5.0% by weight of phenylbis(2,4,6-trimethylbenzoyl)phosphine oxide 14.

It is worth mentioning that the applying method of the nail tip composition kit 100 further comprises a step of: applying the top gel coat 70 on the fingernail 90.

It is worth mentioning that in the applying method of the nail tip composition kit 100 according to one embodiment of the present invention, the chemical composition of top gel coat 70 includes 60.0-80.0% by weight of the polyurethane acrylate oligomers 71, 10.0-15.0% by weight of 2-hydroxyethyl methacrylate (HEMA) 72, 1.0-5.0% by weight of di(trimethylolpropane) tetraacrylate 73, 1.0-5.0% by weight of pentaerythritol tetra(3-mercaptopropionate) (PETMP) 74, and 0.0-1.0% by weight of the polyether-modified polysiloxane 75.

It is worth mentioning that the nail tip composition kit, in some embodiments, does not include an edge-off flat brush.

Also referring to the drawings, FIG. 15 to FIG. 20 show artificial nail tips with embedded smile line guidelines according to certain embodiments of the invention. As shown in FIG. 15, artificial nail tips may have different shapes (e.g., coffin, tapered, oval) as well as different spacing between the smile line guidelines.

Figure 16:
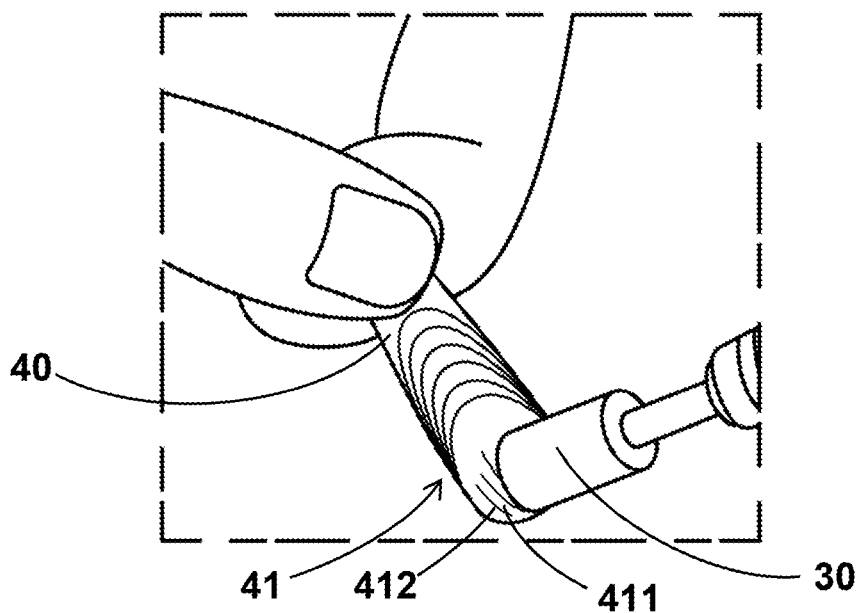
FIG. 16 is a schematic view illustrating the applying method of the artificial nail tip and curing composition set according to certain embodiments of the present invention.

As shown in FIG. 16, a nail filing device 30 is applied to the underside surface 41 of an artificial nail tip 40 to create a rough affixing surface 411 having multiple small, indented grooves 412 thereon. A suitable nail filing device 30 may be, for example, a nail dremel.

Figure 17:
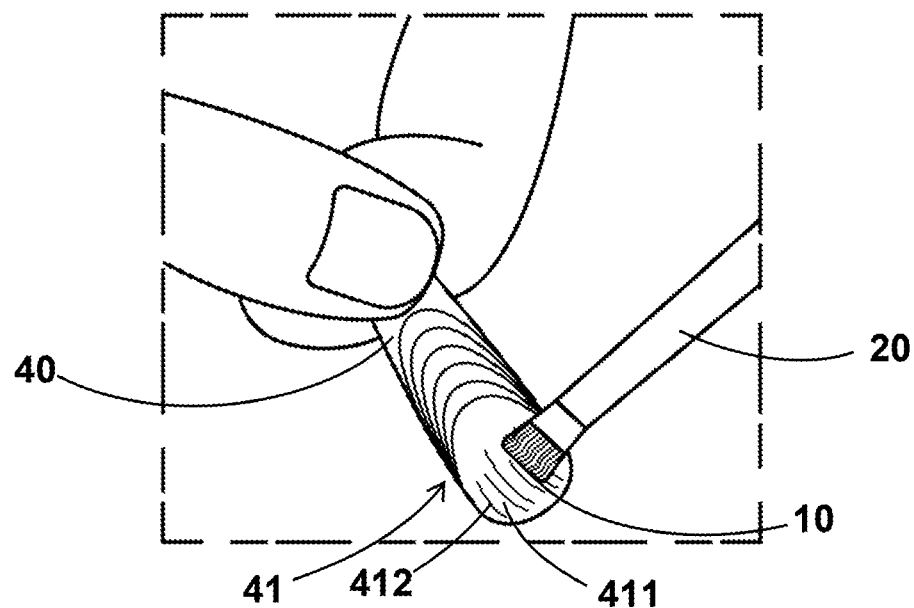
FIG. 17 is a schematic view illustrating the applying method of the artificial nail tip and curing composition set according to certain embodiments of the present invention.

As shown in FIG. 17, an edge-off flat brush 20 is used to apply a small drop of gel composition 10 to the rough affixing surface 411 on a portion of the underside contact surface 41 of an artificial nail tip 40. The gel composition 10 will flow into the multiple small, indented grooves 412 and be retained therein.

Figure 18:
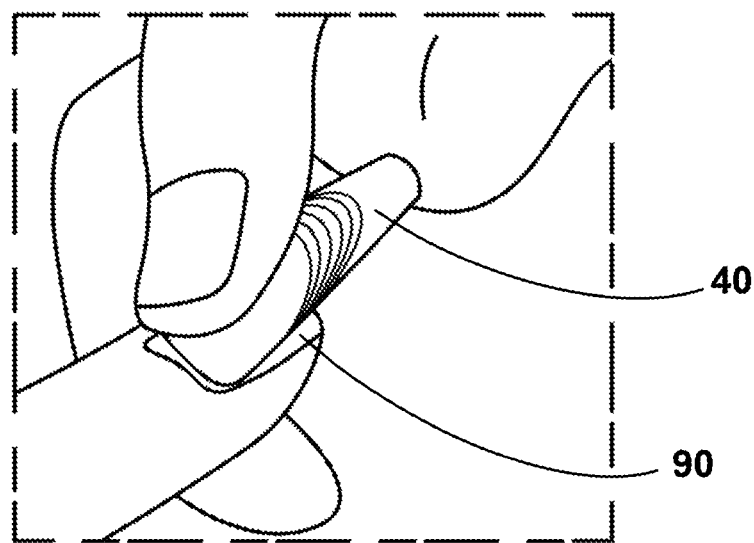
FIG. 18 is a schematic view illustrating the applying method of the artificial nail tip and curing composition set according to certain embodiments of the present invention.

As shown in FIG. 18, an artificial nail tip 40 is pressed onto the fingernail 90 gradually from base to tip of the artificial nail tip 40 to prevent air bubbles or lifting and to ensure a tight seal. In this way, the gel composition on the underside contact surface of the artificial nail tip 40 forms an adhesive layer between the artificial nail tip 40 and the fingernail 90.

Figure 19:
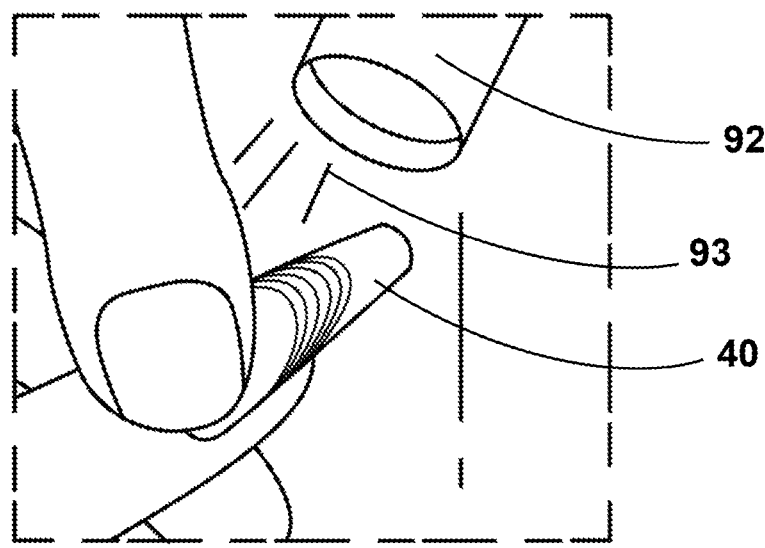
FIG. 19 is a schematic view illustrating the applying method of the artificial nail tip and curing composition set according to certain embodiments of the present invention.

As shown in FIG. 19, an external force is pressed down upon the artificial nail tip 40 while UV light 93 from LED lamp 92 is applied to the artificial nail tip 40 for about 10 sec. In this way, the gel composition which forms an adhesive layer between the artificial nail tip 40 and the fingernail is flash cured. The LED lamp 92 may be, for example, a 365 nm or 395 nm LED flashlight.

Figure 20:
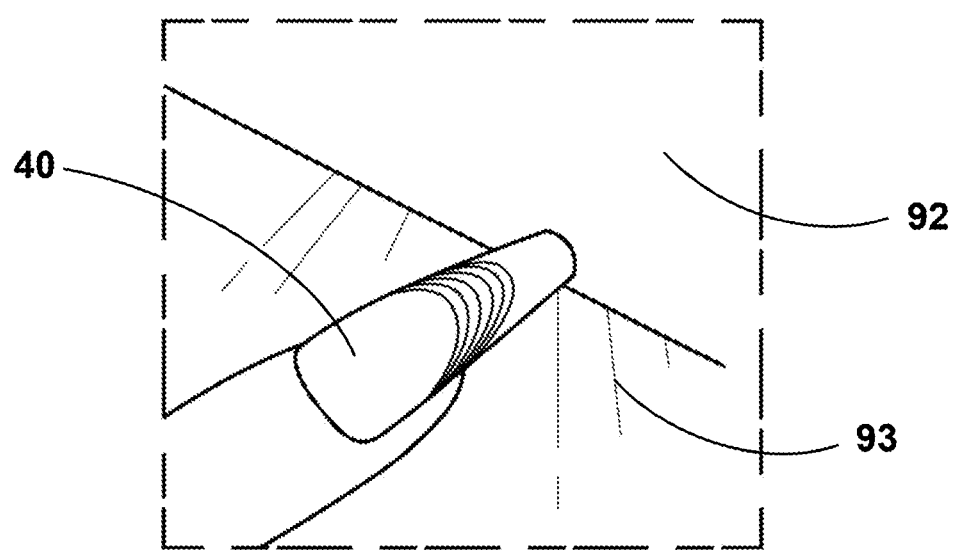
FIG. 20 is a schematic view illustrating the applying method of the artificial nail tip and curing composition set according to certain embodiments of the present invention.

As shown in FIG. 20, the artificial nail tip 40 is then exposed to UV light 93 from a LED lamp 92 for about 30 seconds in order to fully cure and harden the gel composition. The strong adhesive layer thus formed between the artificial nail tip 40 and fingernail affixes the artificial nail tip 40 to the fingernail for at least 2 weeks. Conveniently, this final curing step may be done be placing all five artificial nail tips affixed to the fingernails on one hand under a LED manicure lamp.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An artificial nail tip comprising a topside surface and an underside surface, wherein a surface of the artificial nail tip is embedded with a plurality of guidelines which may or may not be spaced apart equally from one another, wherein each guideline is symmetrically drawn with a gradually wider curvature than a prior guideline.

2. The artificial nail tip of claim 1, wherein the plurality of guidelines form smile lines.

3. The artificial nail tip of claim 1, wherein the plurality of guidelines are embedded on the topside surface.

4. The artificial nail tip of claim 3, wherein the topside surface of the artificial nail tip is embedded with from 2 guidelines to 15 guidelines.

5. The artificial nail tip of claim 1, wherein the plurality of guidelines are embedded on the underside surface.

6. The artificial nail tip of claim 1, wherein the spacing between any two adjacent guidelines, measured from a highest point of the guidelines, is from 1 mm to 6 mm.

7. The artificial nail tip of claim 6, wherein the spacing between any two adjacent guidelines measured from the highest point of the guidelines is different from the spacing measured at ends of the guidelines.

8. The artificial nail tip of claim 1, wherein the guidelines are spaced such that they overlap or touch at one or more points.

9. The artificial nail tip of claim 1, wherein the underside of the artificial nail tip comprises a coarse surface containing multiple indented grooves.

10. The artificial nail tip of claim 1, wherein the artificial nail tip is made from a clear, transparent, translucent, or partially transparent material.

11. The artificial nail tip of claim 1, wherein the artificial nail tip comprises acrylic glass.

12. The artificial nail tip of claim 11, wherein the plurality of guidelines are embedded on the topside surface of the artificial nail tip.

13. The artificial nail tip of claim 1, wherein the artificial nail tip is for a French manicure and comprises acrylic glass, the topside surface is embedded with six symmetrical smile lines, and the artificial nail tip has a stiletto shape, a square shape, a round shape, or a coffin shape.

14. An artificial nail tip and curing composition set for a manicure, comprising:
   at least ten artificial nail tips each having a topside surface and an underside surface, wherein a surface of an artificial nail tip is embedded with a plurality guidelines which may or may not be spaced apart equally from one another;
   a gel composition for forming a gel composition layer on the underside surface of the artificial nail tip;
   a pH bonder for forming a pH bonder layer on a surface of a fingernail; and
   a non-acidic gel primer for forming a non-acidic gel primer layer overlapped on the pH bonder layer,
   wherein a spacing between any two adjacent guidelines measured from a highest point of the guidelines is different from a spacing measured at ends of the guidelines.

15. The artificial nail tip and curing composition set of claim 14, wherein the artificial nail tip is embedded with from 2 guidelines to 15 guidelines.

16. The artificial nail tip of claim 15, wherein the topside surface of the artificial nail tip is embedded with from 2 guidelines to 15 guidelines.

17. The artificial nail tip and curing composition set of claim 14 further comprising a LED lamp for curing and hardening the gel composition layer between the artificial nail tip and the fingernail for enhancing a bonding and adhering ability of the gel composition layer between the artificial nail tip and the fingernail.

* * * * *